United States Patent
Maute et al.

(10) Patent No.: US 9,044,849 B2
(45) Date of Patent: Jun. 2, 2015

(54) POWER TOOL, PARTICULARLY A HAND POWER TOOL, THE HOUSING PARTS THEREOF BEING CONNECTED BY MEANS OF FORM-FITTING ELEMENTS

(75) Inventors: Joerg Maute, Sindelfingen (DE);
Florian Esenwein, Uhingen-Holzhausen (DE); Peter Stierle, Pliezhausen (DE);
Thomas Schomisch, Filderstadt (DE)

(73) Assignee: Robert Bosch GmbH, Stuttgart, DE (US)

( * ) Notice: Subject to any disclaimer, the term of this patent is extended or adjusted under 35 U.S.C. 154(b) by 826 days.

(21) Appl. No.: 13/322,513

(22) PCT Filed: Apr. 16, 2010

(86) PCT No.: PCT/EP2010/055028
§ 371 (c)(1),
(2), (4) Date: Feb. 11, 2012

(87) PCT Pub. No.: WO2010/136262
PCT Pub. Date: Dec. 2, 2010

(65) Prior Publication Data
US 2012/0186844 A1    Jul. 26, 2012

(30) Foreign Application Priority Data

May 27, 2009   (DE) .......................... 10 2009 026 516

(51) Int. Cl.
*B25F 5/02*   (2006.01)
*B24B 23/02*   (2006.01)
*H02K 5/14*   (2006.01)
*H02K 7/14*   (2006.01)

(52) U.S. Cl.
CPC ................ *B25F 5/02* (2013.01); *B24B 23/028* (2013.01); *H02K 5/148* (2013.01); *H02K 7/145* (2013.01)

(58) Field of Classification Search
CPC .............. B25F 5/02; H02K 5/04; H02K 5/10; H02K 5/148; B24B 23/028
USPC .................... 310/50, 47, 89; 173/217; 16/902
See application file for complete search history.

(56) References Cited

U.S. PATENT DOCUMENTS 5,640,741 A * 6/1997 Yano ............................... 16/421
6,527,630 B2 * 3/2003 Mannsperger et al. ....... 451/344

(Continued)

FOREIGN PATENT DOCUMENTS

| CN | 1662346 A | 8/2005 |
| CN | 1880030 A | 12/2006 |
| CN | 101088715 A | 12/2007 |
| DE | 195 38 252 A1 | 4/1996 |
| DE | 199 59 920 A1 | 6/2001 |
| DE | 10 2007 017243 A1 | 10/2008 |

(Continued)

OTHER PUBLICATIONS

International Search Report corresponding to PCT Application No. PCT/EP2010/055028, mailed Oct. 27, 2010, (German and English language document) (12 pages).

*Primary Examiner* — Andrew M Tecco
(74) *Attorney, Agent, or Firm* — Maginot, Moore & Beck LLP

(57) ABSTRACT

A power tool, particularly a hand power tool, has a motor housing and a housing cover, in which a brush cover can be removably inserted. Corresponding form-fitting elements are arranged on the motor housing and on the housing cover, said elements being connected to each other in a form-fitting manner in the assembled position. The brush cover is held on the housing cover and/or on the motor housing in a form-fitting manner.

18 Claims, 10 Drawing Sheets

(56) References Cited

U.S. PATENT DOCUMENTS

Figure 1:
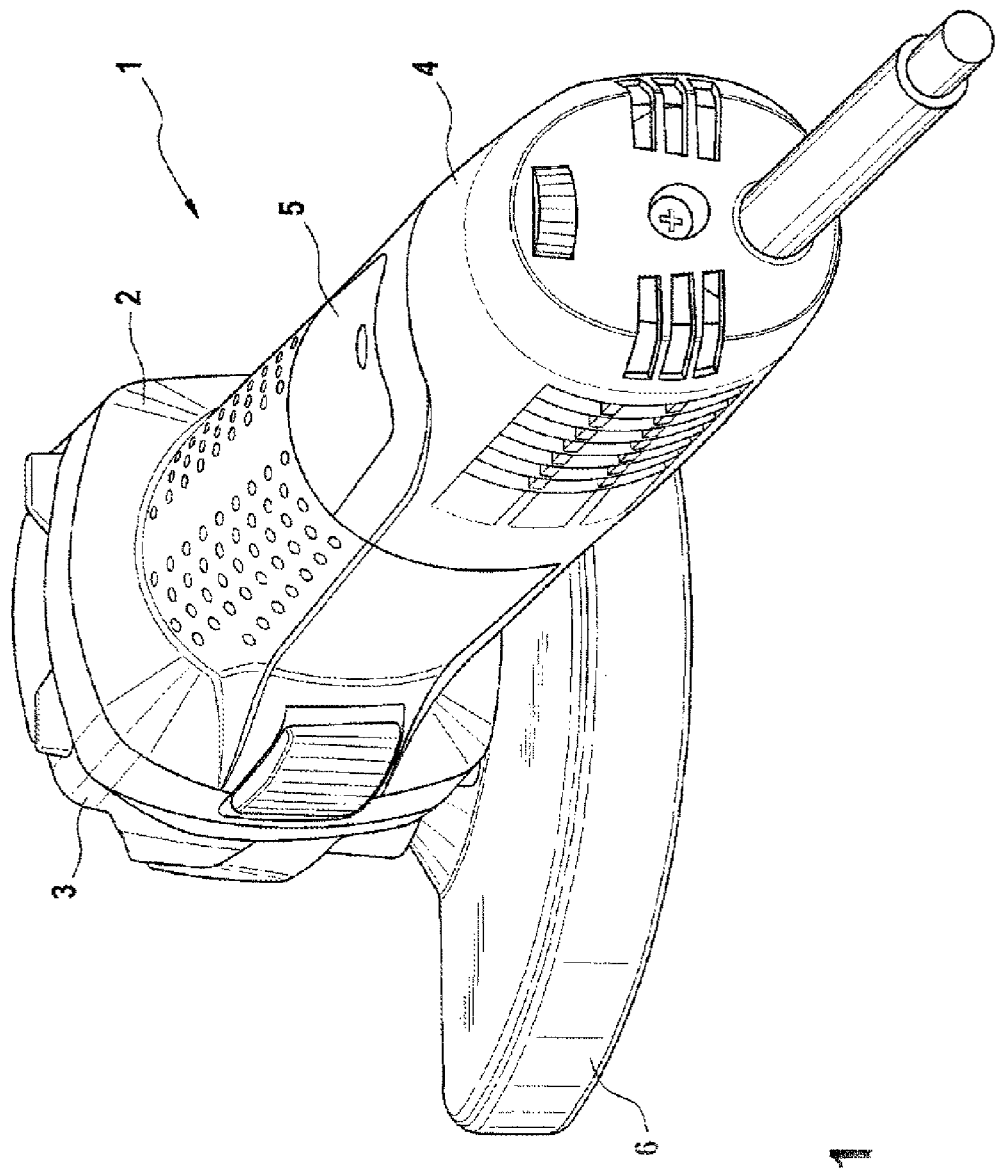

| | | | |
|---|---|---|---|
| 6,594,863 B2 * | 7/2003 | Spooner | 16/436 |
| 8,113,922 B2 * | 2/2012 | Esenwein | 451/359 |
| 8,716,908 B2 * | 5/2014 | Takeda et al. | 310/50 |
| 2001/0014576 A1 * | 8/2001 | Mannsperger et al. | 451/344 |
| 2005/0257944 A1 * | 11/2005 | Cooper | 173/217 |
| 2009/0280732 A1 * | 11/2009 | Esenwein | 451/359 |
| 2011/0227429 A1 * | 9/2011 | Takeda et al. | 310/50 |

FOREIGN PATENT DOCUMENTS

| | | | |
|---|---|---|---|
| EP | 0 502 363 A1 | 9/1992 | |
| EP | 502363 A1 * | 9/1992 | B25F 5/02 |
| WO | 2008/025605 A1 | 3/2008 | |
| WO | 2009/068340 A1 | 6/2009 | |
| WO | 2009/118070 A1 | 10/2009 | |
| WO | 2010/023008 A1 | 3/2010 | |
| WO | 2010/026963 A1 | 3/2010 | |

* cited by examiner

POWER TOOL, PARTICULARLY A HAND POWER TOOL, THE HOUSING PARTS THEREOF BEING CONNECTED BY MEANS OF FORM-FITTING ELEMENTS

This application is a 35 U.S.C. §371 National Stage Application of PCT/EP2010/055028, filed on Apr. 16, 2010, which claims the benefit of priority to Application Ser. No. DE 10 2009 026 516.3, filed on May 27, 2009 in Germany, the disclosures of which are incorporated herein by reference in their entirety.

The disclosure relates to a power tool, particularly a hand power tool, having a housing that includes a motor housing and a housing cover.

BACKGROUND

Known from DE 10 2007 017 243 A1 is a hand power tool having an electric drive motor in a multi-part housing that comprises a transmission housing and a motor housing, wherein the motor housing, in which the electric drive motor is accommodated, is provided with a pot-shaped housing cover that is detachably connected to the motor housing. Let into the housing cover, adjacent to the end face thereof, there is a recess in which there is inserted a brush cover, which, in the assembled state, is disposed axially at the level of the brushes of the electric motor. The brush cover is likewise detachably accommodated in the housing cover and can be opened for the purpose of servicing the carbon brushes. The housing cover can remain in its assembled position on the motor housing when the brush cover is opened.

The motor housing, the housing cover and the brush cover are usually composed of plastic, and are produced by injection molding. A high degree of dimensional accuracy must be observed in this case in order to ensure that, in the assembled state, the outside surface of the housing is smooth, including in the region of the housing part transitions.

SUMMARY

The disclosure is based on the object of ensuring by simple means that, in power tools, the outer contour of the housing has a smooth surface.

This object is achieved, according to the disclosure, by the features set forth below. Expedient developments are also set forth below.

The power tool according to the disclosure, which is, for example, an electric hand power tool, has a housing that comprises a motor housing and a housing cover, wherein an electric drive motor is accommodated in the motor housing. Detachably accommodated in a recess in the housing cover there is a brush cover, which can be removed from the housing cover, for the purpose of servicing carbon brushes of the electric drive motor, without the need for the housing cover also to be detached from the motor housing.

According to a first aspect of the disclosure, corresponding form-fitting elements are disposed on the motor housing and on the housing cover, which elements are connected to one another in a form-fitting manner in the assembled position. Furthermore, it is provided that the brush cover is also held on the housing cover and/or on the motor housing in a form-fitting manner.

This embodiment has various advantages. Since, on the one hand, both the motor housing and the housing cover are connected to one another in a form-fitting manner and, on the other hand, the brush cover is also held with a form-fit on the housing cover and/or on the motor housing, the form-fit can compensate tolerances or a material distortion that can occur even during production of the housing parts or during assembly and/or during operation of the power tool. Particularly in the case in which the brush cover recess extends as far as the free end face of the housing cover, in the transition region between the axial wall delimiting the recess and the end face of the housing cover there is a free-standing corner that is subject to an increased risk of being bent up radially, which would result in the corner projecting over the outer contour of the housing when the housing cover is in the assembled state. Owing to the form-fit, however, a smooth surface is achieved for the outside of the housing, even if one or more housing parts are not dimensionally accurate. Any housing parts that protrude radially in the non-integrated state are forced into the desired mounting position by means of the form-fit, such that a smooth outside surface is achieved despite a distortion or dimensional inaccuracy of the housing cover.

Owing to the combined form-fit between the various housing parts acting together, the brush cover can also be a means by which securing or, if necessary, locking, can be achieved between the motor housing and the housing cover. During assembly, in a first step the motor housing and the housing cover are connected to one another in a form-fitting manner, whereupon, in a second step, the brush cover is inserted, the form-fit of which can be used to fix the form-fit that exists between the motor housing and the housing cover. At the same time, the brush cover form-fit serves to secure the brush cover to the motor housing or to the housing cover. It can also be expedient, however, to provide an additional, other way of connecting the brush cover to the housing cover, for example by screwing the brush cover to the housing cover or to a component located under the latter, particularly to the motor housing or to a component connected thereto.

The form-fit between the motor housing and the housing cover is effected, for example, via a centering rib that is realized on the motor housing and projects above the circumferential surface of a connecting portion on the motor housing on which the housing cover is assembled. A portion of the housing cover is supported, in the circumferential direction, on the centering rib on the motor housing. The centering rib can, if necessary, have a support surface that is positioned obliquely on the motor housing, relative to the circumferential direction, and that serves to support a housing cover part. The oblique position of the centering rib causes the housing cover part bearing thereon to be pressed inward in the radial direction, thereby ensuring that the outside surface of the housing is smooth.

It is also possible, however, to provide an undercut region on the centering rib on the motor housing, which undercut region extends between the radially raised centering rib and the circumferential surface of the connecting portion on the motor housing, a housing cover part projecting into the undercut region in the assembled state. The undercut region can be shaped such that, in a manner similar to the obliquely positioned centering rib, a radial force component acts inwardly on the inwardly projecting housing cover part. In both cases, i.e. both in the case of an obliquely positioned centering rib and in the case of an undercut region delimited by the centering rib, insertion of the housing cover is effected, expediently, in the axial direction. Advantageously, a rib recess, for receiving the centering rib, is let into the housing cover for this purpose.

A form-fit, in the circumferential direction and/or radial direction, between the motor housing and the housing cover can also be achieved in that a groove is realized on one of the components concerned and a web is realized on the other component, and the groove or the web extends in the axial direction of the housing, such that the web can be introduced axially into the groove.

Furthermore, it is possible for a hook element, extending in the circumferential direction and provided with a form-fitting device, to be disposed on the brush cover recess. The form-fitting device extends, expediently, in the axial direction, and therefore orthogonally in relation to the hook element, and is for bringing into form-fitting engagement with a corresponding form-fitting device on the motor housing. Moreover, it is possible for the form-fitting device to extend in the radial direction and, when in the assembled position, to be overlapped radially by the brush cover. The brush cover thereby assumes the function of pressing the housing cover radially against the connecting portion on the motor housing and securing it in this position.

According to yet a further advantageous embodiment, a slot that extends in the axial direction is let into the connecting portion on the motor housing, wherein a cover rib on the housing cover and/or on the brush cover engages in said slot in the assembled position. By this means, likewise, a form-fitting connection can be produced in the circumferential direction between the housing cover and the motor housing and/or between the brush cover and the motor housing. According to an advantageous development, at least one cover rib, for engaging in the slot on the motor housing, is disposed, respectively, both on the housing cover and on the brush cover. In this case, there may either be one common slot on the motor housing, the cover ribs of both the housing cover and the brush cover engaging in said slot, or there may be two separately realized slots, disposed parallelwise next to one another and extending in the axial direction, of which in each case one of the cover ribs is assigned to the housing cover and the second of the cover ribs is assigned to the brush cover.

Furthermore, it is possible for the brush cover to be provided with a form-fitting element that, in the assembled position, engages in a corresponding form-fitting element either on the motor housing or on the housing cover. The form-fitting element on the brush cover is located, expediently, on the underside thereof, and is realized, for example, as a radially inwardly projecting lobe, which engages in a corresponding slot recess either on the housing cover and/or on the motor housing. The form-fit is produced in the radial direction and acts both in the axial direction and in the circumferential direction.

According to another advantageous embodiment, at least one radially inwardly offset shading rib, for protecting electrical components, is disposed on the inside of the housing cover, which shading rib is for bringing into engagement with an associated recess on the motor housing. For this purpose, the shading rib can be elongated axially and, if necessary, project over the end face of the housing cover. The form-fit between the shading rib and the associated recess is produced in the axial direction and acts in the circumferential direction and, if necessary, also in the radial direction.

A further aspect of the disclosure likewise relates to a power tool, particularly an electric hand power tool, which is provided with a motor housing and with a housing cover that preferably can be placed axially on the motor housing. The housing cover has a brush cover, which is detachably inserted in a brush cover recess let into the housing cover. To enable brush changing to be performed with little effort, a radially reinforced portion is realized on the housing cover and/or on the brush cover, in the region of the wall that delimits the brush cover recess and receives the brush cover, the wall thickness of said portion being greater than that of adjacent wall portions.

This embodiment makes it possible to partially or fully eliminate a play between the radially adjacent housing parts during assembly as the brush cover is placed on, in that the housing cover is pressed radially inwards, said play also being referred to as assembly clearance, since it is necessary for joining the parts. The play in the radial direction allows the housing cover likewise to deform in the radial direction, such that any outwardly projecting housing cover portions are pressed inward, and a smooth outer housing surface is thereby achieved. The radially reinforced portion is located, in particular, immediately adjacent to the corners that typically are set radially in the transition between an axial delimitation of the brush cover recess and the end face of the housing cover, these corners being susceptible to unwanted radial widening. Since the radially reinforced portion is located next to this corner, or extends as far as this corner, the insertion of the brush cover causes both the radially reinforced portion and the immediately adjacent wall portions to be pressed radially inward.

According to an expedient embodiment, it is provided that the radially reinforced portion has a wedge shape, the wall thickness becoming greater in the direction of the end face of the housing cover. Owing to the wedge shape, the wall thickness increases in the axial direction towards the free end face, such that a radial widening in the housing cover that is more pronounced adjacent to the free end face is compensated by the greater wall thickness of the radially thickened region.

According to yet a further aspect of the disclosure, the power tool, which, in particular, is an electric hand power tool, has a housing composed axially of a motor housing and a housing cover, an electric drive motor being accommodated in the motor housing. The housing cover is provided with a brush cover recess for receiving a brush cover that can be detached from the housing cover for servicing purposes with the housing cover assembled. Furthermore, a reinforcing web is provided, which completely spans the brush cover recess in the circumferential direction and improves considerably the stiffness of the housing cover, thereby reducing the risk of radial widening and, associated therewith, of a housing part projecting over the circumferential surface of the housing. The reinforcing web extending in the circumferential direction is preferably located immediately adjacent to the end face of the housing cover, embodiments in which the housing web is disposed at an axial distance from the end face also being possibilities, if appropriate.

Figure 2:
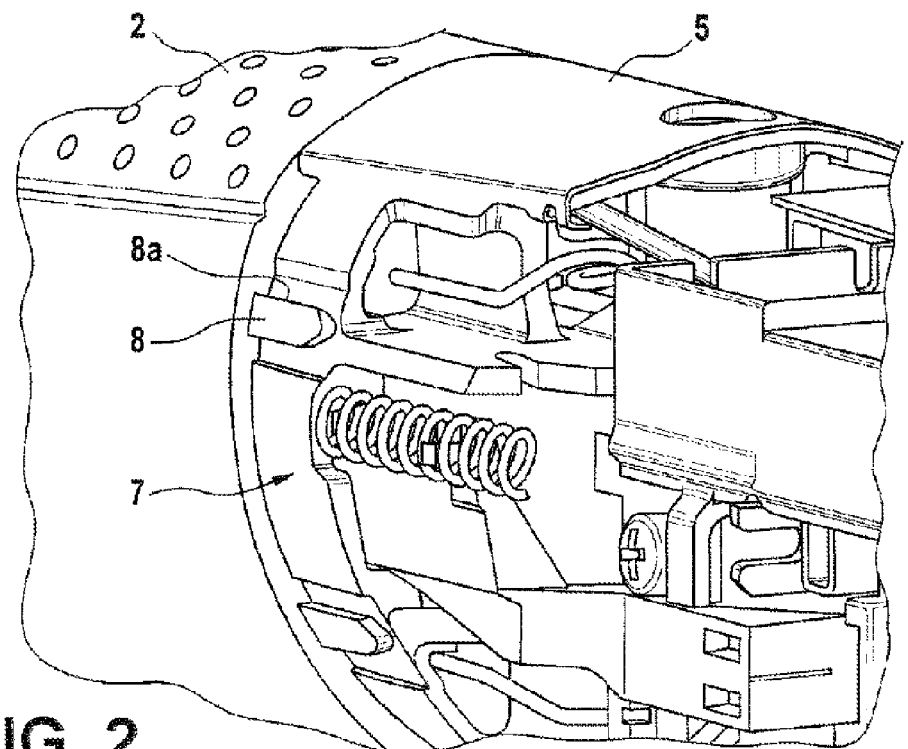
Figure 3:
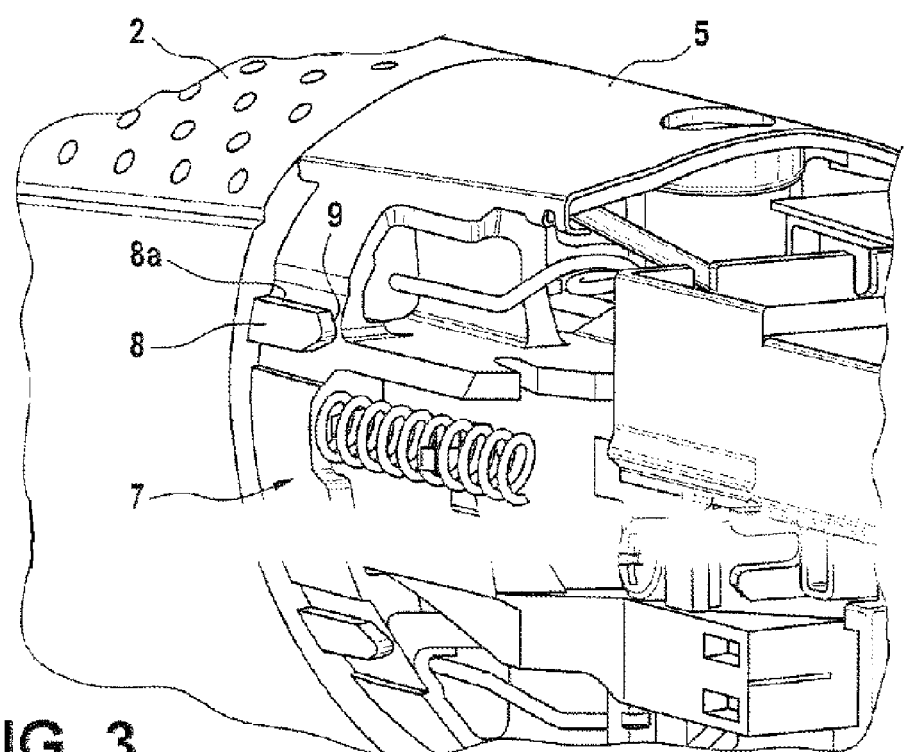
Figure 4:
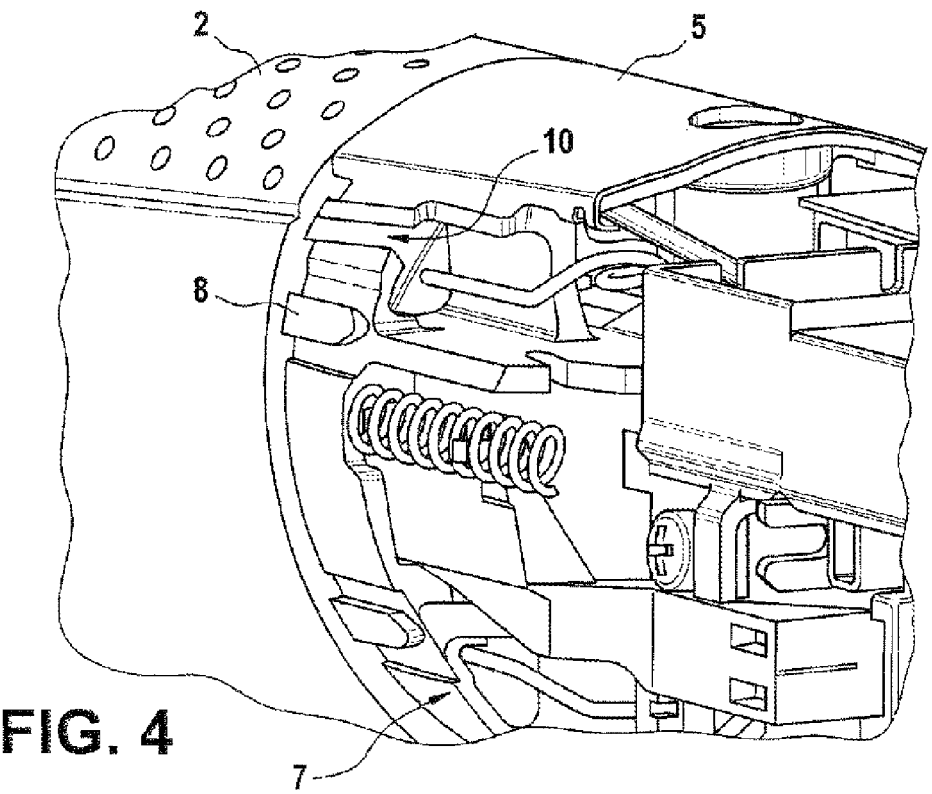
Figure 5:
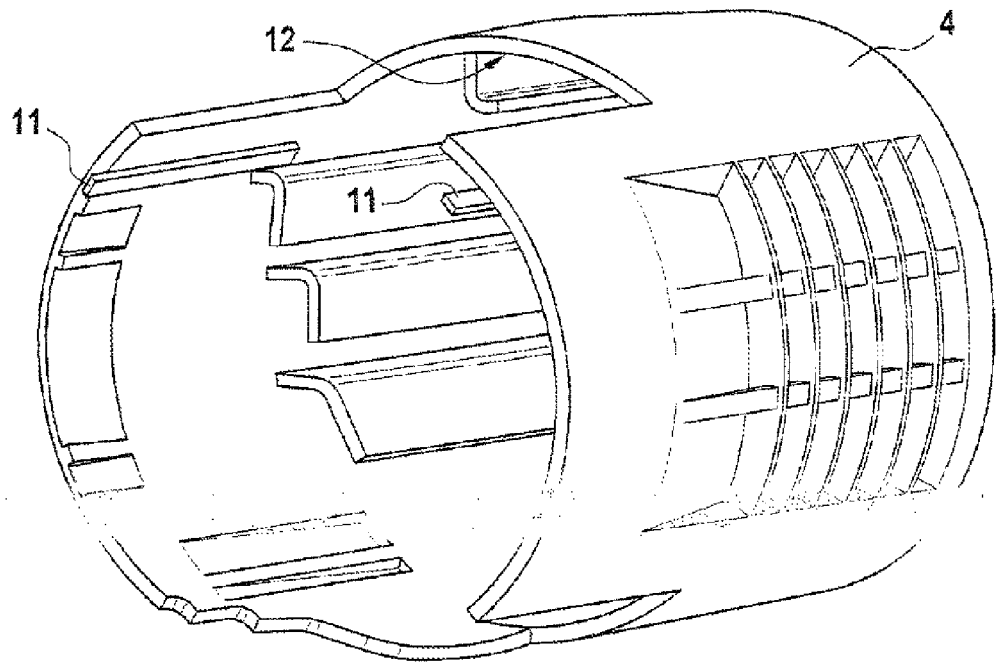
Figure 6:
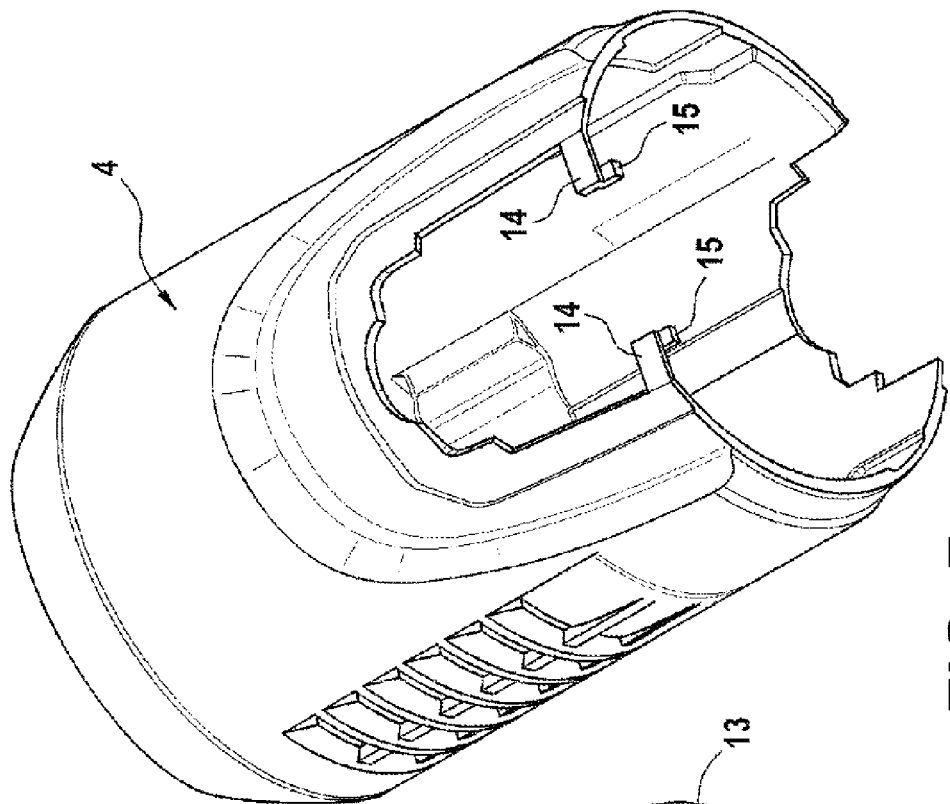
Figure 7:
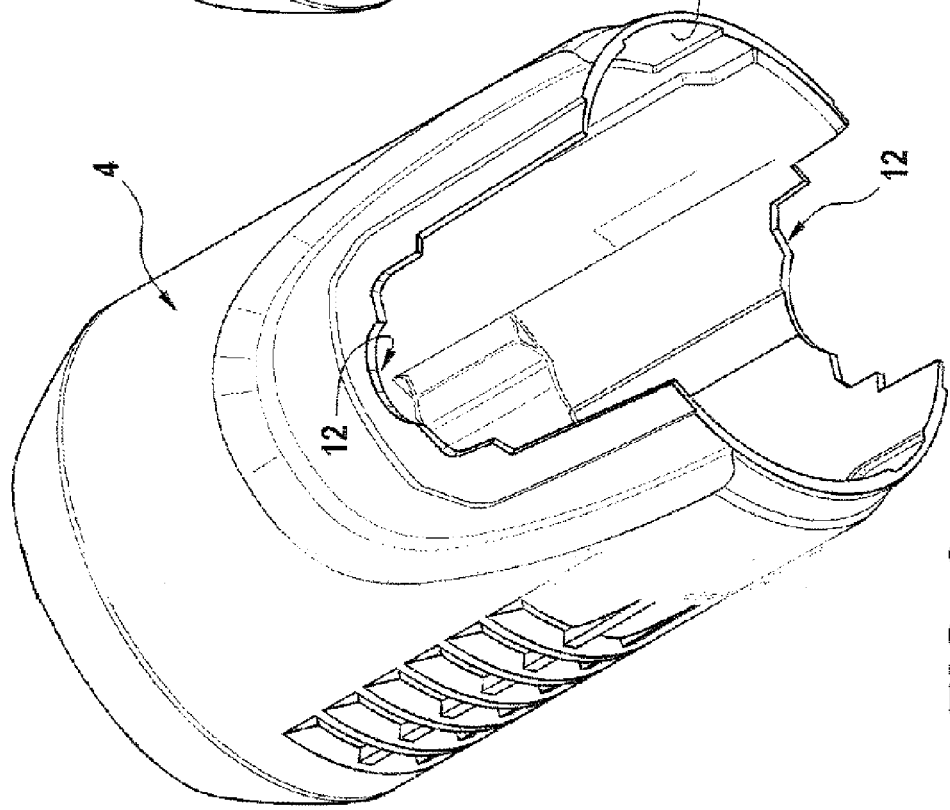
Figure 8:
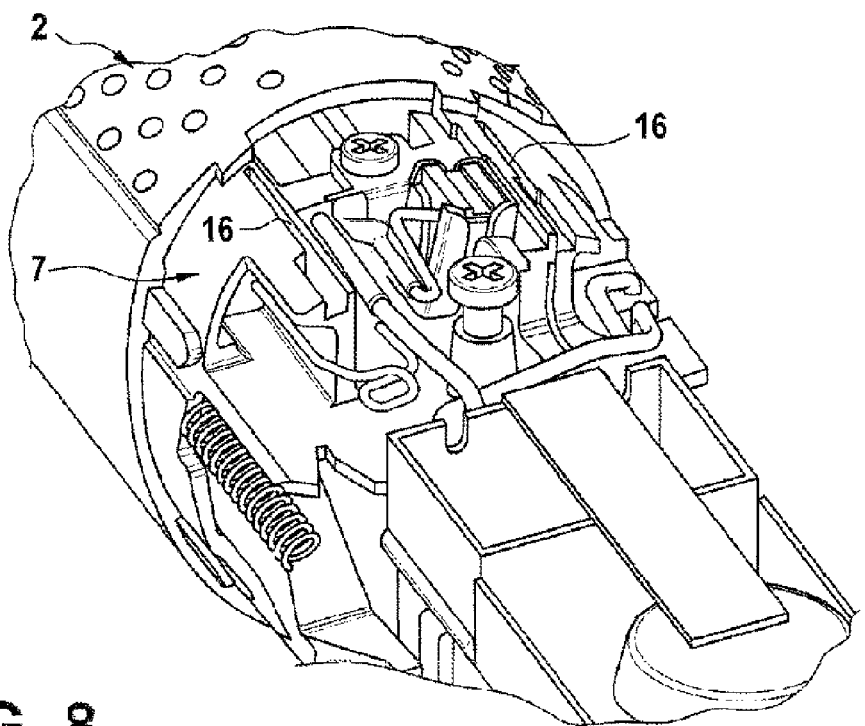
Figure 9:
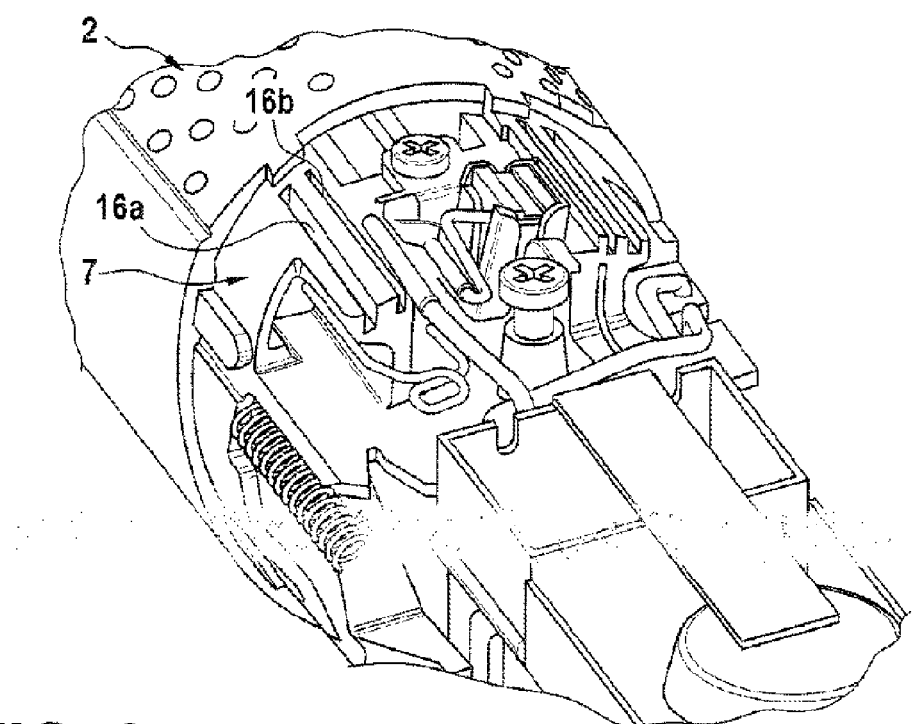
Figure 10:
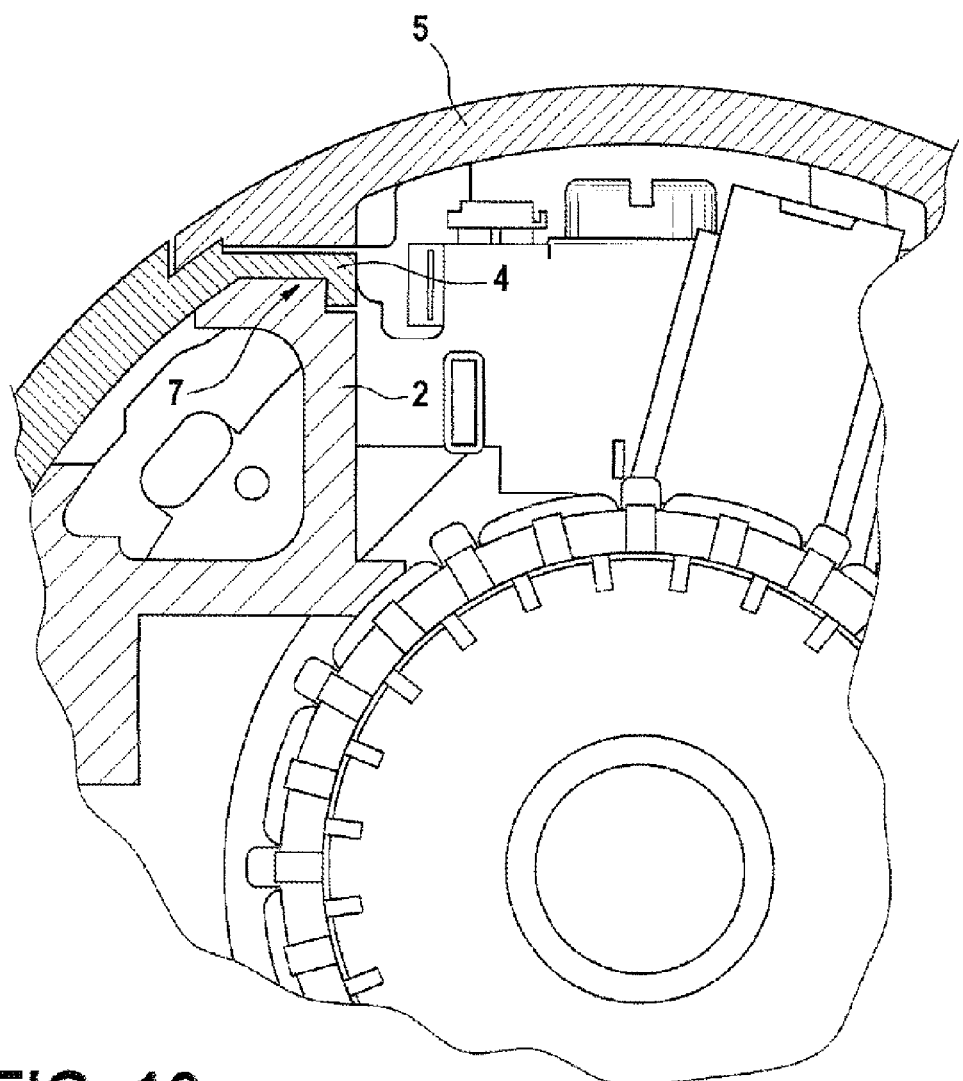
Figure 11:
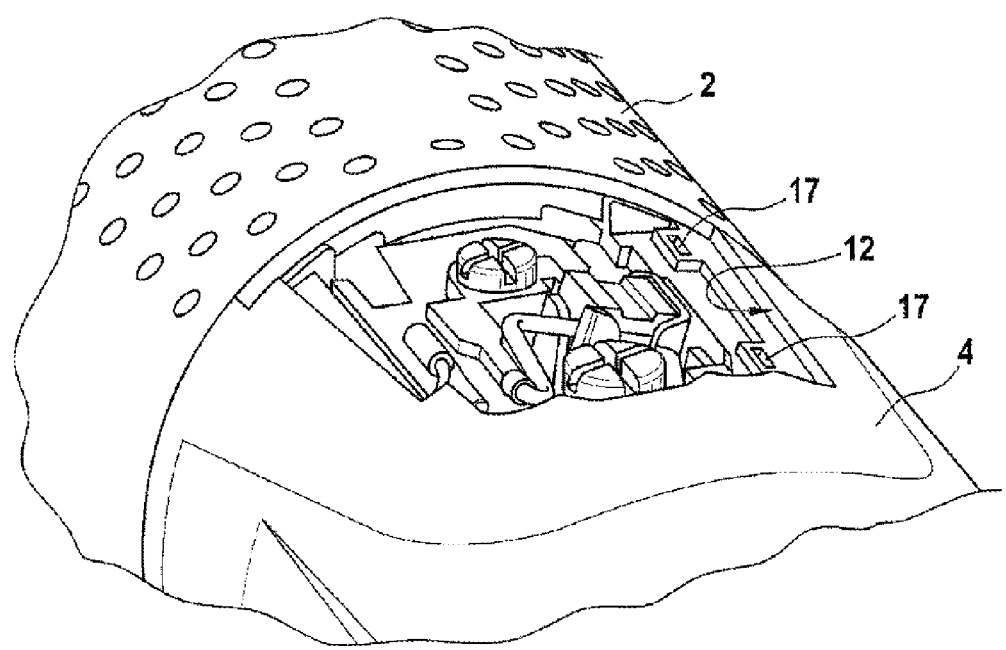
Figure 12:
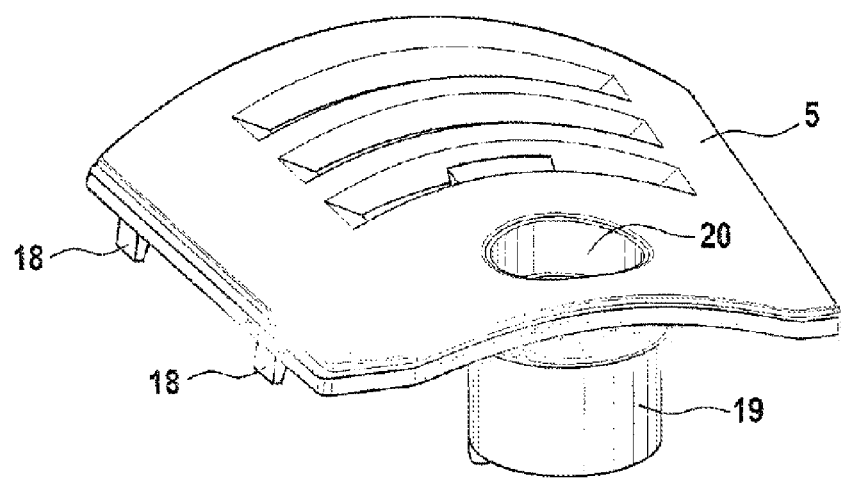
Figure 13:
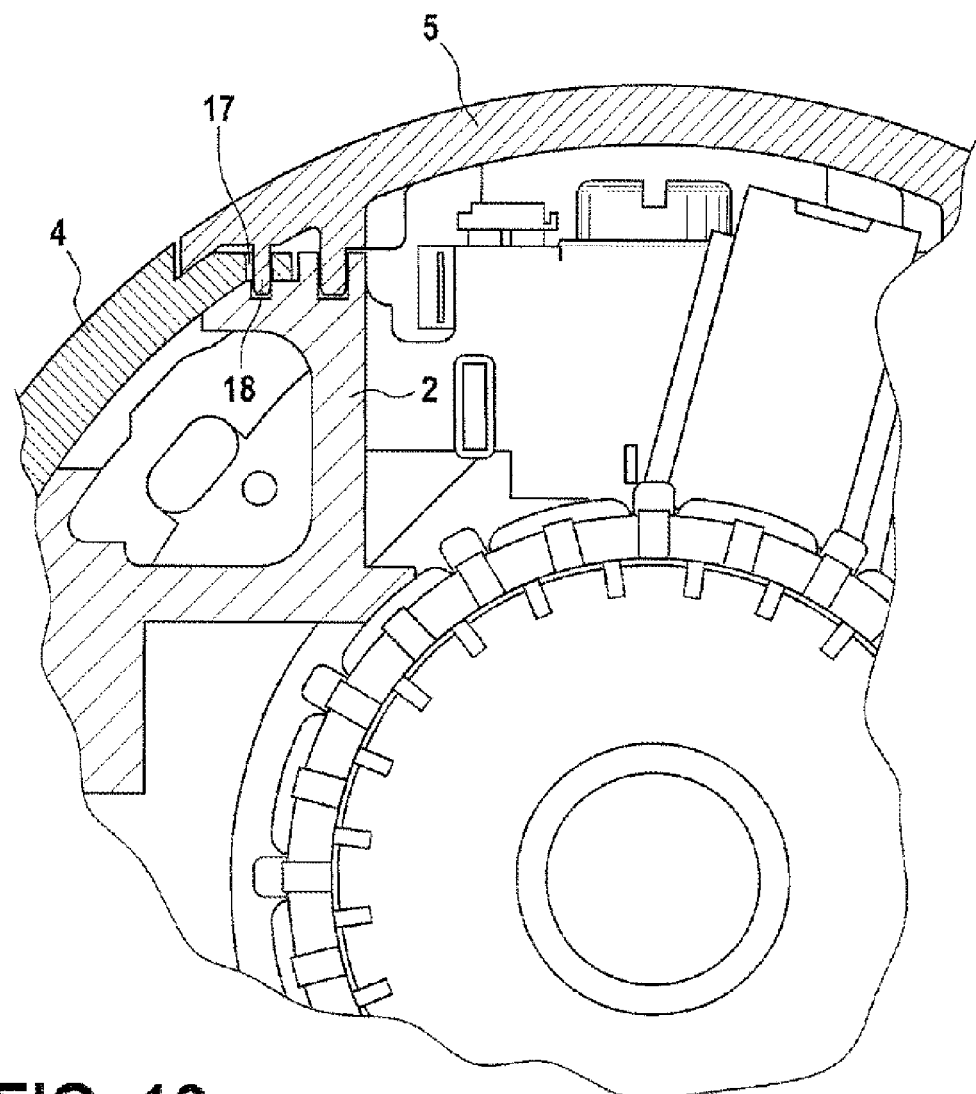
Figure 14:
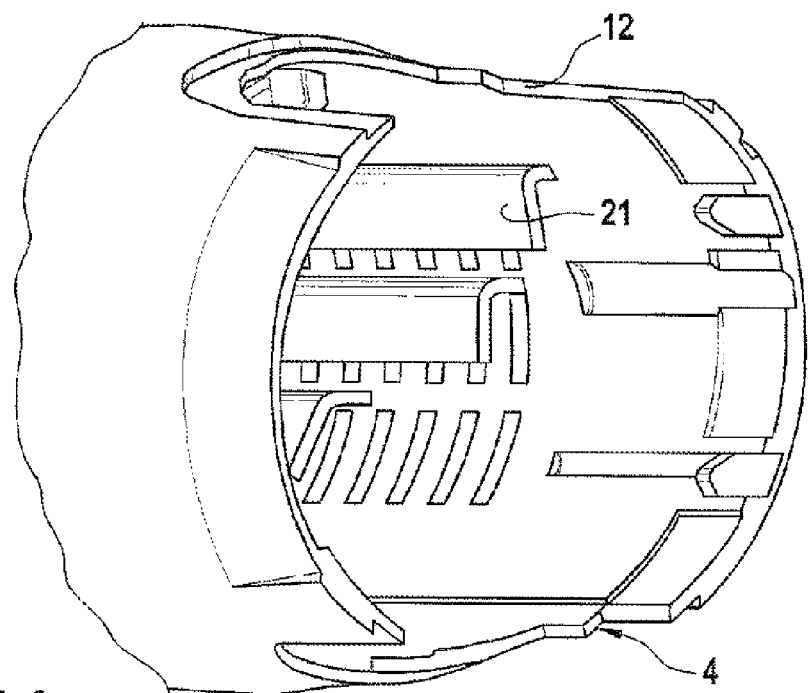
Figure 15:
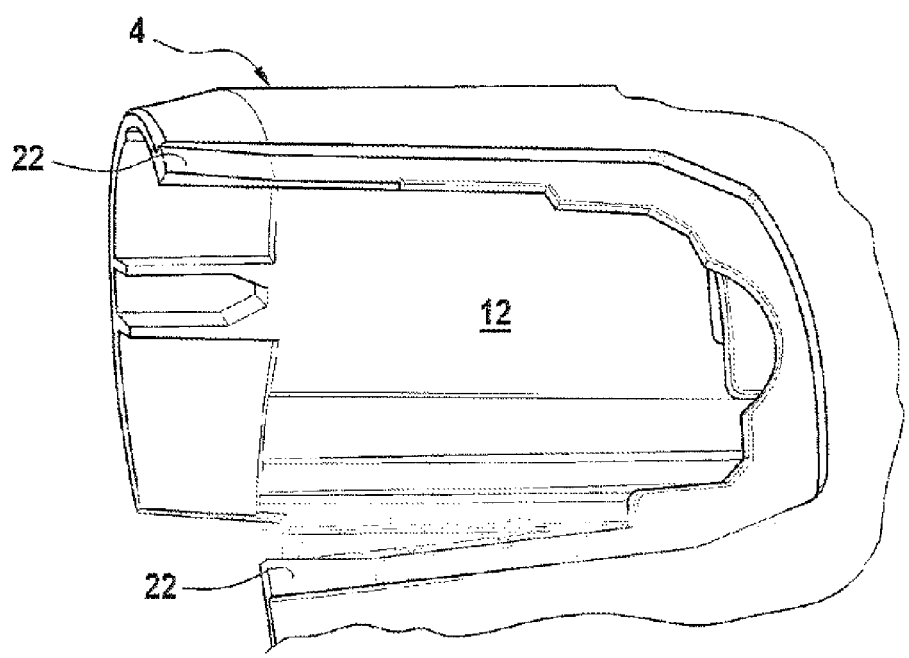
Figure 17:
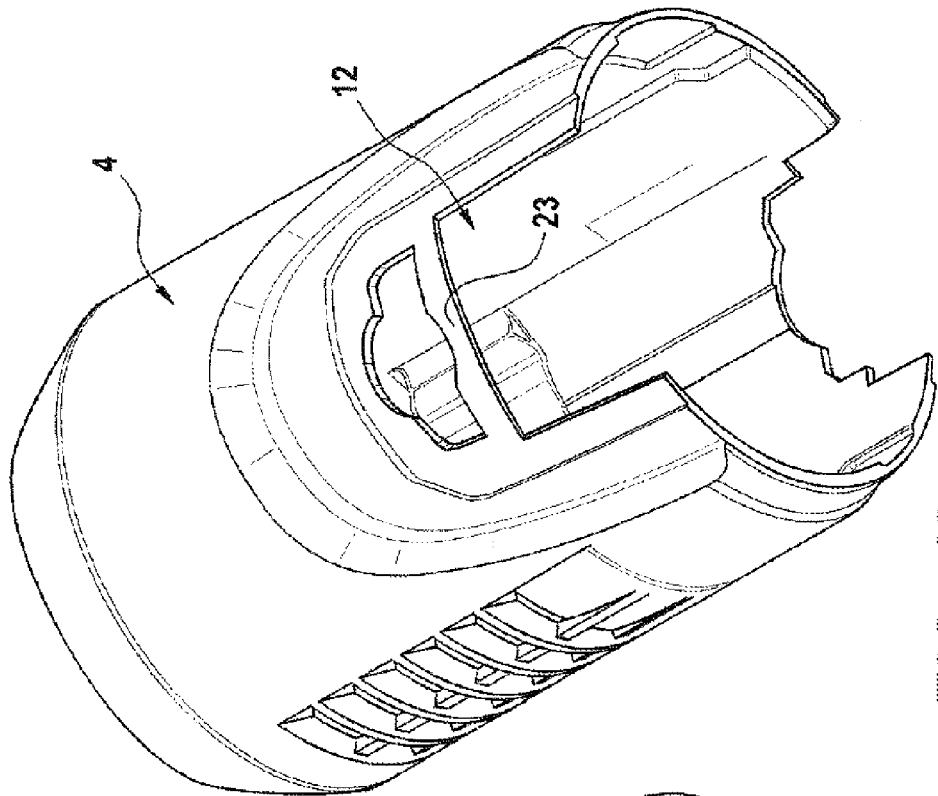
Figure 16:
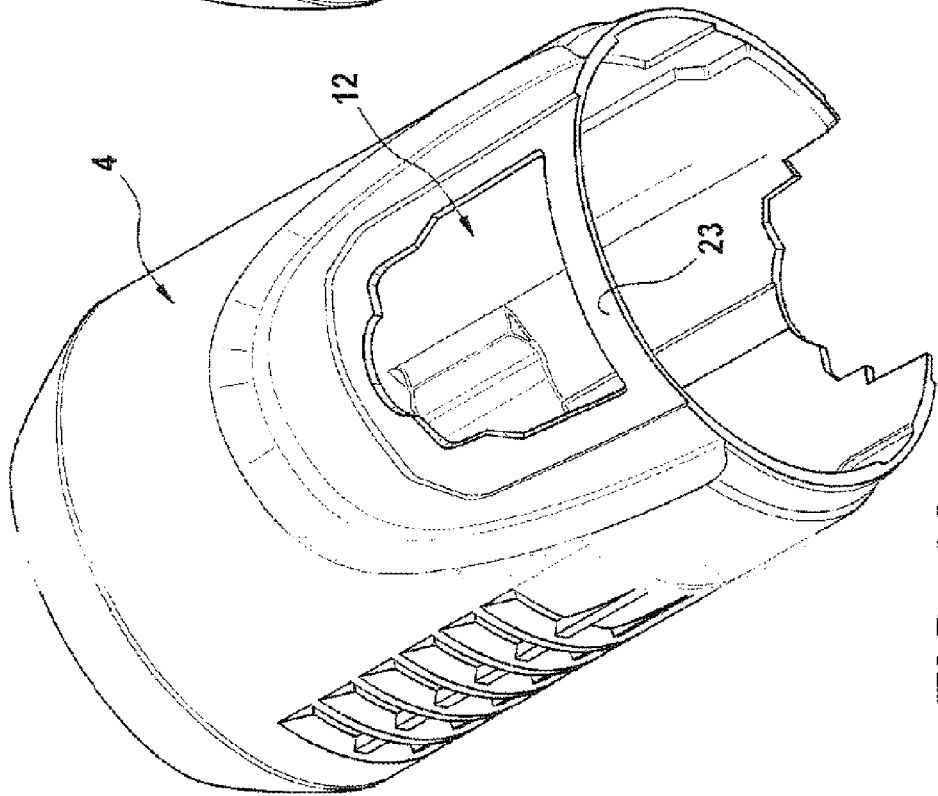

Further advantages and expedient embodiments are given by the further claims, the description of the figures and the drawings, wherein:

FIG. 1 shows a perspective representation of an electric hand power tool, realized as an angle grinder, having a motor housing and, disposed thereon, a housing cover, in which a brush cover is inserted, FIG. 2 shows an enlarged representation of the motor housing in the region of a connecting portion, on which the housing portion is to be placed, an obliquely positioned centering rib being disposed on the connecting portion, FIG. 3 shows an embodiment similar to that in FIG. 2, but with an undercut region delimited by the centering rib, FIG. 4 shows the motor housing in a further embodiment with a receiving groove extending in the axial direction, FIG. 5 shows a detail representation of a housing cover with webs, extending in the axial direction, that are to be inserted axially in receiving grooves according to the embodiment according to FIG. 4, FIG. 6 shows a perspective detail representation of a housing cover with a widened axial groove on the housing inner wall, in the region of the end face, for receiving a centering rib, FIG. 7 shows a housing cover in a further embodiment with hook elements, extending in the circumferential direction, adjacent to the free end face of the housing cover, FIG. 8 shows a motor housing with slots, extending in the axial direction, for receiving cover ribs on the underside of the brush cover, or of the housing cover, FIG. 9 shows an embodiment similar to FIG. 8, but with two slots located directly next to one another in the motor housing, FIG. 10 shows a sectional representation through a fully assembled housing, with a radially inner motor housing, an intermediate housing cover and a radially outer brush cover, FIG. 11 shows a top-view representation of a motor housing and a housing cover with the brush cover having been removed, a receiving form-fitting element, which serves to receive a cover rib or cover knob on the inside of the brush cover, being realized on the housing cover, in the region of the brush cover recess, FIG. 12 shows a detail representation of a brush cover with a dome, extending on the underside, for receiving a connecting screw, and with lobes, which are disposed in the lateral region and which can be inserted in the receiving form-fitting elements on the brush cover receiver, FIG. 13 shows a sectional representation through the housing according to FIGS. 11 and 12, FIG. 14 shows a housing cover with shading ribs disposed on the inner wall and extending in the axial direction, FIG. 15 shows a housing cover with a radially reinforced portion in the region of the wall delimiting the brush cover recess, FIG. 16 shows a housing cover with a reinforcing web, which spans the brush cover recess in the circumferential direction and is disposed immediately adjacent to the end face of the housing cover, FIG. 17 shows a housing cover in a further embodiment, which is similar to FIG. 16, the reinforcing web being disposed at an axial distance from the end face of the housing cover.

In the figures, components that are the same are denoted by the same references.

The electric hand power tool 1 represented in FIG. 1 is, for example, an angle grinder, which has a motor housing 2 for receiving an electric drive motor. Adjoining the motor housing 2 axially is a transmission housing, in which a tool of the electric hand power tool 1 is assembled and overlapped by a protective hood 6. Adjoining the motor housing 2 axially on the side opposite the transmission housing 3 there is a housing cover 4, which is in the form of a component realized separately from the motor housing 2, and which can be detachably connected to the motor housing 2. On the top side of the housing cover 4 there is a brush cover 5, which is inserted in a detachable manner in a brush cover recess in the housing cover 4. The brush cover 5 can be removed from and reinserted in the brush cover recess without detaching the housing cover. When the brush cover 5 is removed, servicing work can be performed on carbon brushes of the electric drive motor, which are located immediately underneath. If necessary, such a brush cover, detachably inserted in the housing cover, is also located diametrically opposite, on the underside of the housing cover.

Expediently, the motor housing 2, the housing cover 4 and the brush cover 5 are each composed of plastic and are produced by plastic injection molding.

The brush cover or brush covers 5 is/are preferably held on the motor housing 2 and/or on the housing cover 4 in a form-fitting manner and, moreover, are connected to the motor housing, or to a component connected to the motor housing, by means of a connecting screw or similar connecting element.

FIG. 2 shows the housing of the hand power tool without the housing cover, with the brush cover 5 placed on.

In the region of connection to the motor housing 2, the latter has a connecting portion 7 realized in the form of a ring and extending in the direction of the housing cover. Relative to the outer circumferential surface of the motor housing 2, the connecting portion 7 is offset slightly inward radially for the purpose of receiving the housing cover and the brush cover in a flush manner.

Realized so as to be integral with the connecting portion 7 there is a centering rib 8, which is raised radially and has a lateral support surface 8a. This lateral support surface 8a is beveled in such a way that, in relation to a radial, the support surface 8a encloses an angle, such that a component on the housing cover being supported on the lateral support surface 8a is subjected to a radially inwardly directed force component. In this way, it is ensured that the housing cover does not have any components protruding radially over the outside of the housing in the region of its axial end face, despite the possible existence of a distortion or dimensional tolerances. Rather, any corners, edges or the like that protrude radially outward are forced into a desired reference or standard position by means of the centering rib 8 having the beveled support surface 8a, such that a smooth outer surface of the housing is ensured.

The exemplary embodiment according to FIG. 3 corresponds largely to that according to FIG. 2, but with the difference that the lateral support surface 8a of the centering rib 8 extends in the radial direction. Furthermore, it is provided that the support surface 8a delimits an undercut region 9 formed on the connecting portion 7. The undercut region 9 is realized as a groove, and comprises a groove that is delimited by the centering rib 8 and that serves to receive a component of the housing cover in a form-fitting manner.

Both in the exemplary embodiment according to FIG. 2 and in the exemplary embodiment according to FIG. 3, the housing cover, when in the assembled position, is held on the motor housing 2 in a form-fitting manner in the circumferential direction and also radially outward.

In the exemplary embodiment according to FIGS. 4 and 5, a further form-fitting connection is represented between the motor housing 2 and the housing cover 4. As can be seen from FIG. 4, a groove 10, extending in the axial direction, is let into the motor housing 2, in the region of the connecting portion 7, which groove serves to receive a web 11, extending in the axial direction, disposed on the inner wall of the housing cover 4. The web 11 can project axially over the free end face of the housing cover 4. Expediently, a plurality of grooves 10 and webs 11 are provided, distributed over the circumference, as are centering ribs on the connecting piece 7, which are for bringing into engagement with corresponding recesses on the housing cover. The groove and web connection according to FIGS. 4 and 5 likewise constitutes a form-fitting connection in the circumferential direction and, if necessary, also in the radial direction.

As can further be seen from FIG. 5, let into the housing cover 4 there is a brush cover recess 12, which is open toward the end face of the housing cover. The brush cover recess 12, extending as far as the axial end face, serves to receive the brush cover. Adjacent to the brush cover recess 12, a web 11, extending in the axial direction in each case, is disposed on the inner wall of the housing 4. As the web 11 engages in a form-fitting manner in the associated groove 10 on the motor housing 2, the corner, immediately adjacent to the web 11, between the circumference at the end face of the housing cover 4 and the wall that axially delimits the brush cover recess 12 is also fixed in position in the radial direction and in the circumferential direction.

As can be seen from FIG. 6, a respective brush cover recess 12 is let into the housing cover 4, on diametrically opposite sides. At the end face, between the opposing brush cover recesses 12, a respective widened groove 13 is provided on the inside of the wall of the housing cover 4, the widened groove 13 serving to receive the centering ribs 8 (FIGS. 2 to 4) on the motor housing 2. The widened grooves 13 are located, in the circumferential direction, between the brush cover recesses 12.

In the exemplary embodiment according to FIG. 7, in the region of the end face of the housing cover 4 the brush cover recess 12 is partially overlapped in the circumferential direction by a respective hook element 14. Each of the hook elements 14 extending in the circumferential direction projects, at the end face of the housing cover 4, into the brush recess 12. On the underside of each hook element 14 there is a form-fitting device 15 in the form of a projection that, relative to the hook element 14, extends both radially inward and axially beyond the free end face of the housing cover 4. The form-fitting device 15 is for bringing into form-fitting engagement with an associated recess on the motor housing, and thereby provides for a form-fit in the radial direction and in the circumferential direction. To produce the form-fit, the form-fitting device 15 is introduced axially into the associated recess.

In the exemplary embodiment according to FIG. 8, a slot 16 is let into the connecting portion 7 of the motor housing 2, which slot extends in the axial direction and serves to receive a cover rib disposed on the underside of the housing cover and also, if necessary, on the underside of the brush cover. Two slots 16 are provided, which run parallelwise in relation to one another, extending in the axial direction, and which, in the circumferential direction, are apart from one another along approximately the extent of the brush cover. The slots 16 provide for a form-fit in the circumferential direction. Each slot 16 can have a widened run-in region in the region of an axial slot end face, said run-in region making it easier for the cover rib on the underside of the housing cover or of the brush cover to be introduced axially. This widened region can also serve to receive a cover rib in the assembled state, particularly if both a cover rib on the housing cover and a cover rib on the brush cover are received in the respective slot 16.

In the exemplary embodiment according to FIG. 9, the connecting portion 7 of the motor housing 2 is likewise provided with slots, extending in the longitudinal direction, which serve to receive cover ribs. Unlike the previous exemplary embodiment, however, two slots 16a and 16b are provided that are directly adjacent to one another, which are each provided to receive a cover rib on the housing cover or on the brush cover.

In the exemplary embodiment according to FIG. 2, the housing parts are represented in the assembled state. The housing cover 4, which is overlapped by the brush cover 5, lies on the connecting portion 7 of the motor housing 2. Formed on the connecting portion 7 there is a shoulder, projecting radially inward to which there is a bent-over offset on the housing cover 4. In this way, a form-fit is formed, in the circumferential direction, between the motor housing 2 and the housing cover 4.

There is also a form-fitting connection, in the circumferential direction, between the top side of the housing cover 4 and the underside of the brush cover 5. Corresponding offsets are realized for this purpose on the housing cover 4 and on the brush cover 5.

FIGS. 11 and 12 show a further exemplary embodiment of a form-fitting connection of the brush cover 5 on the housing cover 4. In the region of the wall delimiting the brush cover recess 12, the housing cover 4 has a slot-type recess 17, into which, in the assembled state, a lobe 18 disposed on the underside of the brush cover 5 projects in a form-fitting manner, such that a form-fit is achieved in the circumferential direction. The form-fit is produced by placing the brush cover on radially. Expediently, a plurality of lobes 18 and associated slot-type recesses 17 are provided.

As can further be seen from FIG. 12, realized on the underside of the brush cover 5, so as to be integral therewith, there is a dome 19, which, on the top side of the brush cover 5, opens into an opening 20, via which a connecting device, for example a screw, can be inserted, by means of which the brush cover 5 is connected to the motor housing.

FIG. 13 shows the assembled state with a housing cover 4 according to FIG. 11 and a brush cover 5 according to FIG. 12. It can be seen that, by means of the lobe 18 in the recess 17, the brush cover 5 forms a form-fitting connection with the housing cover 4. Moreover, in the circumferential direction, there is a further form-fitting connection with the motor housing 2, this being by means of a further rib, which is disposed on the underside of the brush cover 5 and which projects into a groove in the top side of the motor housing 2 in a form-fitting manner.

As can be seen from FIG. 14, a plurality of shading ribs 21, arranged parallelwise on the inner wall of the housing cover 4 and projecting radially inward, are realized so as to be integral with the wall of the housing cover. These shading ribs 21 protect electrical components disposed inside the housing. At least one of the shading ribs 21 is elongated axially and, in the assembled state, projects axially into an associated recess on the motor housing. It can be expedient to allow this elongated shading rib 21 to project over the end face of the housing cover 4.

The exemplary embodiment according to FIG. 15 shows a radially reinforced portion 22 in the wall of the housing cover 4 that directly delimits the brush cover recess 12. As compared with the other wall portions delimiting the brush cover recess 12, the radially reinforced portion 22 has a greater radial wall thickness. The radially reinforced portion 22, as viewed in the axial direction, has a wedge shape, the wall thickness increasing towards the end face of the housing cover 4.

In the assembled state, the brush cover lies on the wall portion that directly delimits the brush cover recess 12, said brush cover pressing the housing cover 4 radially inward, particularly in the region of the radially reinforced portion 22, such that any radially bent-up housing cover part in the region of the end face of the housing cover is brought into a desired shape, in which a smooth housing surface is achieved.

In the exemplary embodiment according to FIG. 16, at least one brush cover recess 12 in the housing cover 4 is spanned completely by a reinforcing web 23 extending in the circumferential direction. According to FIG. 16, this reinforcing web 23 is located in the region of the axial end face of the housing cover 4.

In the exemplary embodiment according to FIG. 17, a reinforcing web 23 spanning the brush cover recess 12 in the circumferential direction is likewise provided in the housing cover 4. However, the reinforcing web 23 is positioned at an axial distance from the end face of the housing cover 4.

The invention claimed is:

1. A power tool, comprising:
a housing including a motor housing and a housing cover,
an electric drive motor positioned in the motor housing, and having a brush cover configured to be detachably inserted in a brush cover recess defined in the housing cover, and
form-fitting elements disposed on the motor housing and on the housing cover, wherein the form-fitting elements are connected to one another in form-fitting fashion in an assembled position, and wherein the brush cover is held on the housing cover and/or on the motor housing in form-fitting fashion;
wherein a slot that extends in the axial direction is defined in at least one of (i) a connecting portion on the motor housing, (ii) a cover rib on the housing cover, and (iii) on the brush cover engaging in said slot in the assembled position; and
wherein two parallel slots, disposed next to one another and extending in the axial direction, are defined in the connecting portion on the motor housing, wherein a cover rib on the housing cover engages in a first slot and a cover rib on the brush cover engages in the second slot.

2. The power tool as claimed in claim 1, wherein the form-fitting elements include a centering rib located on the motor housing, the centering rib being configured to project above a circumferential surface of a connecting portion on the motor housing and on which a housing cover part is supported in the circumferential direction.

3. The power tool as claimed in claim 2, wherein the centering rib on the motor housing comprises a support surface that is positioned obliquely relative to the circumferential direction.

4. The power tool as claimed in claim 2, wherein the centering rib on the motor housing delimits an undercut region in relation to the circumferential surface of the connecting portion on the motor housing, and wherein, in the assembled state, the housing cover part projects into the undercut region.

5. The power tool as claimed in claim 2, wherein a rib recess, configured to receive the centering rib, is defined the housing cover.

6. The power tool as claimed in claim 1, wherein one of the form-fitting elements on the motor housing or on the housing cover includes a groove structure defining a groove and one includes a web, wherein the groove and the web extend in the axial direction of the housing.

7. The power tool as claimed in claim 1, wherein at least one hook element, extending in the circumferential direction and having a form-fitting device, is disposed on the brush cover recess in the housing cover.

8. The power tool as claimed in claim 7, wherein the form-fitting device extends in the axial direction and is configured to bring into a form-fit with a corresponding form-fitting device on the motor housing.

9. The power tool as claimed in claim 7, wherein the form-fitting device extends in the radial direction and is configured to bring into a form-fit with a corresponding form-fitting device on the motor housing.

10. The power tool as claimed in claim 9, wherein the form-fitting device, when in the assembled position, is overlapped radially by the brush cover.

11. The power tool as claimed in claim 1, wherein the cover rib is configured to engage the slot on the motor housing and is disposed, respectively, both on the housing cover and on the brush cover.

12. The power tool as claimed in claim 1, wherein disposed on the brush cover there is a form-fitting element that, in the assembled position, engages in a corresponding form-fitting element on the motor housing and/or on the housing cover.

13. The power tool as claimed in claim 1, wherein at least one radially inwardly offset shading rib, for protecting electrical components, is disposed on the inside of the housing cover, which shading rib is configured to be brought into engagement with an associated recess on the motor housing.

14. The power tool as claimed in claim 1,
wherein a radially reinforced portion is included on the housing cover and/or on the brush cover, in the region of a wall that delimits the brush cover recess and receives the brush cover, the wall thickness of said portion being greater than that of adjacent wall portions.

15. The power tool as claimed in claim 14, wherein the radially reinforced portion has a wedge shape.

16. The power tool as claimed in claim 14, wherein the radial wall thickness of the radially reinforced portion becomes greater in the direction of the end face of the housing cover.

17. The power tool as claimed in claim 1, wherein the brush cover recess has a reinforcing web, extending in the circumferential direction, that completely spans the brush cover recess.

18. The power tool as claimed in claim 17, wherein the reinforcing web is disposed in the region of the end face of the housing cover.

* * * * *